United States Patent [19]

Jablonka et al.

[11] Patent Number: 4,555,433

[45] Date of Patent: Nov. 26, 1985

[54] SOUND-ABSORBING ELEMENT

[75] Inventors: Dieter Jablonka; Klaus Urban, both of Herdecke; Heinz-Peter Raidt, Dortmund; Eberhard Schepers, Herdecke, all of Fed. Rep. of Germany

[73] Assignees: Fraunhofer-Gesellschaft zur Förderung der angewandten Forschung e.V., Munich; Ewald Dörken AG, Herdecke, both of Fed. Rep. of Germany

[21] Appl. No.: 530,640

[22] Filed: Sep. 9, 1983

[30] Foreign Application Priority Data

Sep. 10, 1982 [DE] Fed. Rep. of Germany ....... 3233654

[51] Int. Cl.[4] .......................... B32B 3/30; E04B 1/84

[52] U.S. Cl. .................................. 428/166; 181/284; 181/291; 181/293; 428/167; 428/172; 428/178; 428/180

[58] Field of Search ............... 428/167, 166, 178, 180, 428/172; 181/293, 291, 284, 290

[56] References Cited

U.S. PATENT DOCUMENTS

| | | | |
|---|---|---|---|
| 2,840,179 | 6/1958 | Junger | 181/286 |
| 3,124,798 | 10/1955 | Zinke . | |
| 4,241,806 | 12/1980 | Metzger | 181/284 |
| 4,425,981 | 1/1984 | Kiesewetter et al. | 181/288 |

FOREIGN PATENT DOCUMENTS

| | | | |
|---|---|---|---|
| 274461 | 6/1951 | Switzerland | 181/293 |
| 379997 | 8/1932 | United Kingdom . | |
| 801875 | 9/1958 | United Kingdom . | |
| 952199 | 3/1964 | United Kingdom . | |
| 1033063 | 6/1966 | United Kingdom . | |
| 1071238 | 6/1967 | United Kingdom . | |
| 1204695 | 9/1970 | United Kingdom . | |
| 1248767 | 10/1971 | United Kingdom . | |

*Primary Examiner*—Paul J. Thibodeau
*Attorney, Agent, or Firm*—Birch, Stewart, Kolasch & Birch

[57] ABSTRACT

A sound-absorbing element of films has adjacent, cup-shaped recesses in the form of a grid. The bottom surfaces of the films which are to be exposed to the sound field may be excited into dissipative vibrations when sound is incident thereon. The upper edges of the cup-shaped recesses are jointly covered by another flat material web. The bottom surfaces of the cup-shaped recesses are subdivided into bases by one or more crimp-shaped recesses, the depth of which is appreciably smaller than the depth of the cup-shaped recesses. The sound-absorbing element may be used in building, underground and tunnel construction and in vehicle construction.

15 Claims, 9 Drawing Figures

SOUND-ABSORBING ELEMENT

FIELD OF THE INVENTION

This invention relates to a sound-absorbing element of grid-shaped films having adjacent cup-shaped recesses, the bottom surfaces of the films to be exposed to the sound field being excitable into dissipative vibrations when sound is incident thereon, the upper edges of the cup-shaped recesses being jointly covered by another flat web of material.

BACKGROUND OF THE INVENTION

With a sound-absorbing element of this type, as described in its basic design in German Offenlegungsschrift No. 2,758,041, sound is absorbed by natural vibrations of the surfaces of the cup-shaped recesses, mainly vibration of the bottom surfaces, the dimensions of which bottom surfaces are selected so that their natural vibrations fall within the frequency range of audible sound.

The two essential characteristics of such sound-absorbing elements are the relative distribution of the acoustic absorptivity over the different acoustic frequencies and the absolute acoustic absorptivity for the different acoustic frequencies over the complete acoustic frequency range. The relative distribution of the acoustic absorptivity should be distributed as evenly as possible over the complete acoustic frequency range, bearing in mind the frequency-dependent acoustic sensitivity of the human ear and the acoustic frequency spectrum which occurs in each case at the place of application of the sound-absorbing element, so that the sound energy which arises is absorbed as evenly as possible over the complete acoustic frequency spectrum. The absolute acoustic absorptivity for the different acoustic frequencies should be as high as possible, so that as much sound energy as possible is absorbed and so that the sound level is reduced as much as possible. The two above-mentioned characteristics may be represented by a so-called sound absorption curve which reproduces the dependence of the acoustic absorptivity on the acoustic frequency.

Thus, it is desirable to achieve a high integral acoustic absorptivity, which may be ascertained by integrating the sound absorption curve over the acoustic frequency range which is of interest, with as even a distribution of the acoustic absorptivity as possible over the different acoustic frequencies. As described in German Offenlegungsschrift Nos. 2,758,041 and 2,921,050, the combined disclosures of which correspond to U.S. Pat. No. 4,425,981, the relative distribution of the acoustic absorptivity over the different acoustic frequencies may be evened out by making the number of the possible different natural vibrations and of the harmonics thereof and of the harmonic oscillations of these natural vibrations in general as large as possible. This may be effected in a variety of ways, for example by designing the bottom surfaces of the cup-shaped recesses to be rectangular instead of square, because rectangular plates have more natural vibration modes than square plates, and by providing several groups of cup-shaped recesses which are adjacent in a grid-shape and which are distinguished in that the bottom surfaces of the various groups have different sizes.

Thus, it has been shown from the experiments which have led to the present invention that with khown sound-absorbing elements, in which the cup-shaped recesses have in each case a bottom surface of 8×9 cm, it is not possible to absorb the sound energy in a satisfactory manner simultaneously at low and high acoustic frequency ranges. This fact is explained later on with reference to FIG. 6.

An absorption improvement may be achieved theoretically and practically in the higher acoustic frequency range by using cup-shaped recesses which have smaller bottom surfaces, for example with dimensions of 9×4 cm, but at the same time, a deterioration results in the acoustic absorptivity in the middle and low acoustic frequency ranges. These conditions will be explained later on using FIG. 7. On the other hand, if cup-shaped recesses are used which have larger bottom surfaces, then conversely, an improvement is achieved in the acoustic absorptivity in the low acoustic frequency range, but in this case the acoustic absorptivity in the middle and higher acoustic frequency ranges simultaneously deteriorates.

Therefore, in order to even out the acoustic absorptivity for the different acoustic frequencies, it would be necessary, as already indicated above and as described in German Offenlegungsschrift No. 2,921,050 to provide adjacent cup-shaped recesses having large and small bottom surfaces in the sound-absorbing element. However, a disadvantage of such a solution is that the absolute acoustic absorptivity falls, because, apart from overlaps in the middle acoustic frequency range, only one half of the cup-shaped recesses are effective for the lower acoustic frequency range and only the other half of the cup-shaped recesses are effective in the upper acoustic frequency range, if one proceeds from the fact, for example that half the total number of cup-shaped recesses are composed of those having comparatively small bottom surfaces and the other half are composed of those having comparatively large bottom surfaces.

Thus, although the absorption curve is evened out for a given total surface of the bottom surfaces of the cup-shaped recesses, i.e. an improvement in the relative distribution of the acoustic absorptivity, it is over a much flatter level of the absolute acoustic absorptivity for the different acoustic frequencies, so that the absolute integral acoustic absorptivity for the complete acoustic frequency range is not improved, as is to be expected.

SUMMARY OF THE INVENTION

Most surprisingly, it has now been found within the scope of the present invention that, contrary to all expectations, there may simultaneously be achieved a substantial improvement in the relative distribution of the acoustic absorptivity over different acoustic frequencies, as well as (apart from certain peaks) an appreciable increase in the absolute acoustic absorptivity for the different acoustic frequencies, by designing a sound-absorbing element of the above mentioned type so that the bottom surfaces of the cup-shaped recesses are subdivided into bases by one or more crimp-shaped recesses, the depth of which is appreciably smaller than the depth of the cup-shaped recesses.

In this manner, the object which was initially considered as unachievable is now achieved, namely to increase the absorptivity in the case of low and high frequencies, with a given total surface of the bottom surfaces of the cup-shaped recesses or with a given quantity of the absorption material to be introduced, and to simultaneously increase the integral acoustic absorptivity for the complete frequency range. This fact will be explained later on in more detail using FIG. 8.

Thus, the size of the bottom surface of the cup-shaped recesses is initially selected large enough for the low frequency range to be adequately covered, and in order to cover the high frequency range, bases are introduced into these bottom surfaces by the crimp-shaped recesses such that the large bottom surfaces may vibrate in each case in an unhindered manner, and such that the vibrating bases respond to, per se and additively, the higher frequencies.

As was found in the experiments within the scope of the present invention, the crimp-shaped recesses can, however, only make up a part of the depth of the cup-shaped recesses, because otherwise the vibration ability of the large bottom surfaces which are subdivided by the crimp-shaped recesses is stopped.

In an embodiment of the present invention, the crimp-shaped recesses are provided in a sound-absorbing element in which the lateral or surrounding surfaces of adjacent cup-shaped recesses are replaced by a common lateral or surrounding surface, as described in German Offenlegungsschrift No. 3,030,238.

The crimp-shaped recesses may intersect the lateral or surrounding surfaces of the cup-shaped recesses, thereby providing a particularly simple construction which is particularly easy to produce, in which each cup-shaped recess has its own lateral or surrounding surfaces, as described, for example in German Offenlegungsschriften Nos. 2,758,041 and 2,921,050.

However, it is also possible to design the crimp-shaped recesses so that they have their own front surfaces which seal off the crimp-shaped recesses at their longitudinal ends. An embodiment of this type is to be preferred for the previously mentioned sound-absorbing element in which the lateral or surrounding surfaces of adjacent cup-shaped recesses are each replaced by a common lateral or surrounding surface. In the case of such sound-absorbing elements, the crimp-shaped recesses may more preferably be designed so that their front faces are spaced from the common lateral or surrounding surfaces of the cup-shaped recesses, so that the vibration ability of the large bottom surfaces or of the complete bottom surfaces is impaired as little as possible. In particular, the design in this case may be such that the front faces of the crimp-shaped recesses are arranged to meet, at the level of the bottom surfaces of the cup-shaped recesses, with the common lateral or surrounding surfaces of the cup-shaped recesses and the spacing thereof from these common lateral or surrounding surfaces increases towards the bases of the crimp-shaped recesses. In this manner, an optimum subdivision of the bottom surfaces of the cup-shaped recesses is achieved, and impairment to the natural vibrations of the complete bottom surfaces of the cup-shaped recesses is also avoided.

In the case of bottom surfaces of the cup-shaped recesses which are restricted in a straight line, the crimp-shaped recesses are preferably designed to run parallel to one or more lateral boundary lines of the bottom surfaces of cup-shaped recesses. In this arrangement, at least two crossing crimp-shaped recesses which preferably run towards one another at a right angle may be provided in each bottom surface of the cup-shaped recesses.

Finally, an even greater evening-out of the acoustic absorptivity may be achieved in an embodiment of the present invention by providing several crimp-shaped recesses of a varying depth in one bottom surface of the cup-shaped recess such that the bases formed by the crimp-shaped recesses of a greater depth are subdivided into other bases by crimp-shaped recesses of a smaller depth.

The sound-absorbing element according to the present invention may be used as a film absorber which may be excited into dissipative vibrations upon sound incidence, in building, underground and tunnel construction as well as in land-, water- and aircraft construction. Therefore, this sound-absorbing element may be widely used in an extremely versatile manner in areas where undesirable sound energy which penetrates a closed or open space or which is produced in such a space is to be absorbed and thus the sound level in this space is to be substantially reduced. The term "an open space" is to be understood as also designating quite generally a non-delimited outside space area, for example the comparatively near surroundings of a motorway, an airport or the like.

DESCRIPTION OF PREFERRED EMBODIMENTS

Figure 1:
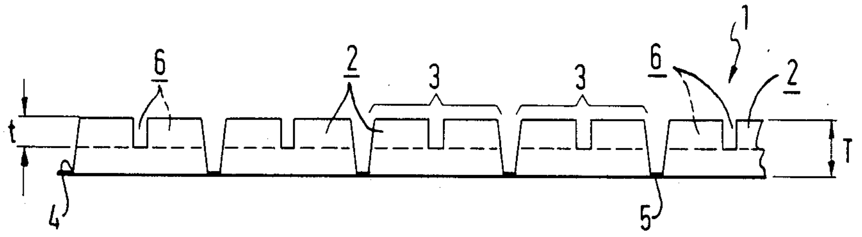
FIG. 1 shows a cross-sectional view through a preferred first embodiment of a part of a sound-absorbing element according to the present invention.
Figure 2:
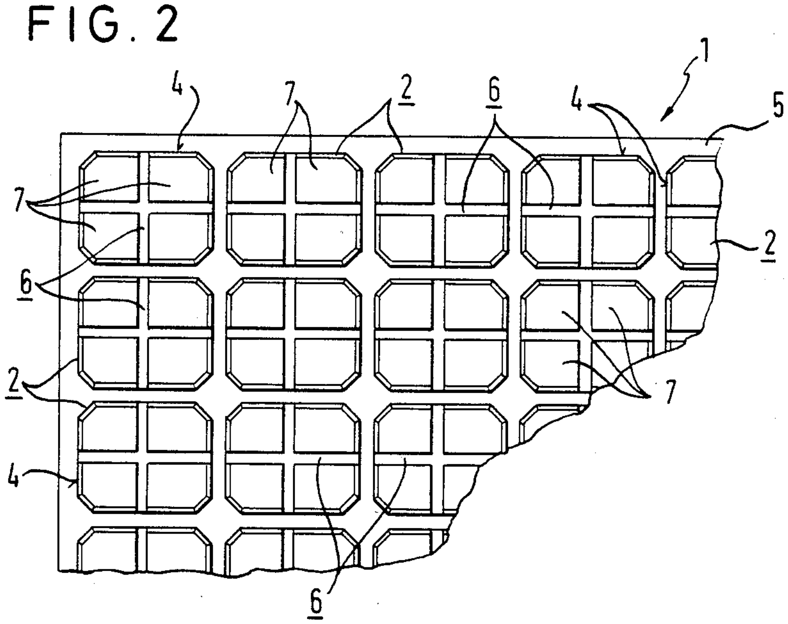
FIG. 2 shows a top view of the part of the embodiment of a sound-absorbing element shown in FIG. 1.

A first embodiment of a sound-absorbing element will be described using FIGS. 1 to 3. It should be noted here that in each case, only one corner piece of such an element, which may extend over large areas of several square meters more, is shown. The sound-absorbing element which is designated as a whole by reference numeral 1 consists of cup-shaped recesses 2 which are adjacent in a grid shape and are imprinted in a film, for example a plastics film, for example being formed therein by deep-drawing. These cup-shaped recesses 2 have bottom surfaces 3 which face the sound field of the sound to be absorbed and are excited by this sound field into dissipative natural vibrations because their size, their area weight and their other characteristic values are adapted so that their natural vibration frequencies lie within the acoustic frequency range. The upper edges 4 of the cup-shaped recesses 2 are jointly covered by another flat web of material 5, so that the interior of the cup-shaped recesses 2 is sealed in an air-tight, or substantially air-tight manner. An air-tightness is not strictly necessary. Consequently, the same pressure as in the surrounding atmosphere prevails inside the cup-shaped recesses 2. The flat material web may be a non-vibratory material web, but it is also possible for it to be a vibratory web, for example a film.

The bottom surfaces 3 of the cup-shaped recesses 2 are subdivided into bases 7 by one or more crimp-shaped recesses 6. The depth t of these recesses 6 is appreciably smaller than the depth T of the cup-shaped recesses (see FIG. 1).

Figure 3:
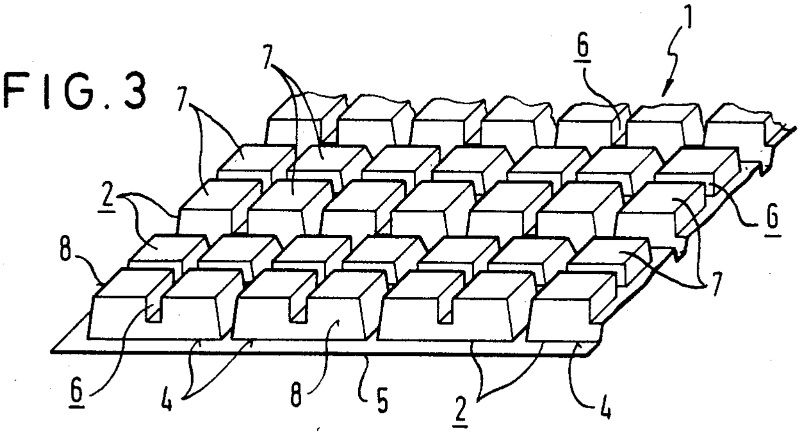
FIG. 3 shows a perspective view of a part of the embodiment of a sound-absorbing element according to FIGS. 1 and 2.

As may be seen particularly clearly from FIG. 3, the crimp-shaped recesses 6 intersect the lateral or generated surfaces 8 of the cup-shaped recesses 2.

Moreover, the crimp-shaped recesses 6 run into the bottom surfaces 3 which are of a rectangular design in the present embodiment, in each case parallel and perpendicular to the lateral boundary lines of these bottom surfaces 3. Two crossing, crimp-shaped recesses 6 which run towards one another at a right angle are provided in each bottom surface 3, so that a complete bottom surface 3 of a cup-shaped recess 2 consists in this case, as it were, of four bases 7 and of two crimp-shaped recesses 6.

It is also possible, although not shown in the drawing, to subdivide each of the bases 7 into subbases by one or more crimp-shaped recesses. In this case, these additional crimp-shaped recesses preferably have a smaller depth than the crimp-shaped recesses 6, but this is not strictly necessary.

Figure 4:
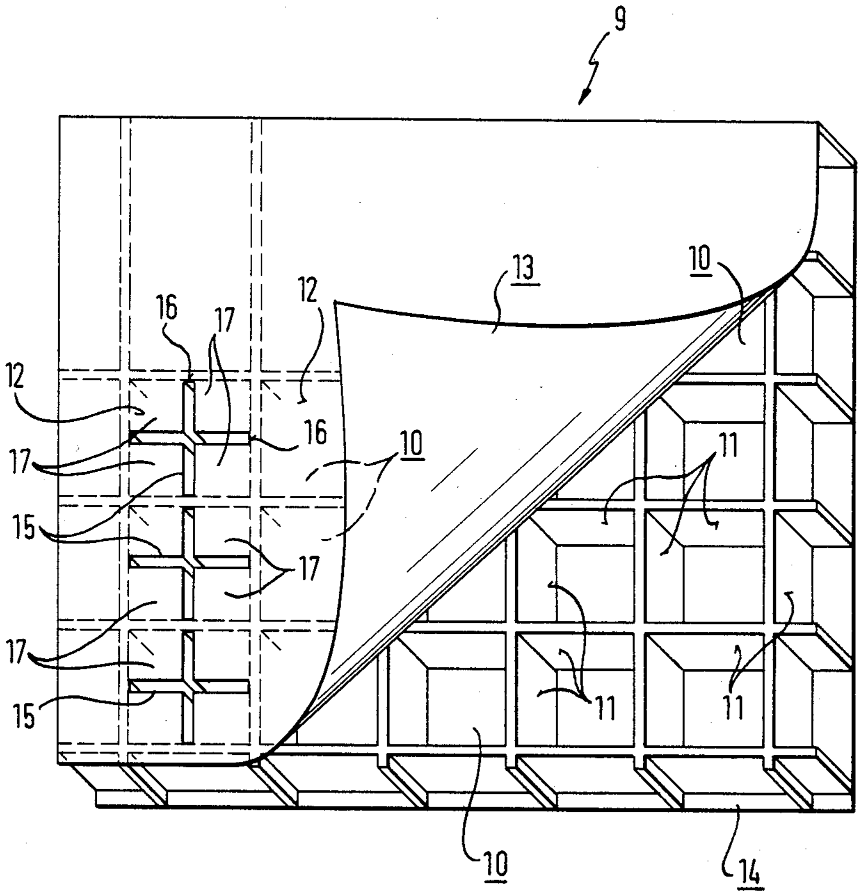
FIG. 4 shows a top view of a part of a sound-absorbing element according to a second embodiment of the present invention, said part of the sound-absorbing element being shown perspectively and in a half dismantled condition in order to show the top film more clearly which forms the bottom surface of the cup-shaped recesses. Moreover, only three, in each case cross-shaped, crimp-shaped recesses have been drawn in, whereas in fact these crimp-shaped recesses are provided in each of the bottom surfaces of the cup-shaped recesses.

A second embodiment of a sound-absorbing element designated as a whole by reference numeral 9 will now be described with reference to FIGS. 4 and 5. In FIG. 4 one corner portion of the element is illustrated in an incompletely assembled condition. In the case of this sound-absorbing element 9, the lateral or generated surfaces, adjacent in each case, of the cup-shaped recesses 10 are formed by a common lateral or surrounding surface 11, whereas the bottom surfaces 12 of the cup-shaped recesses are formed by a common film 13. A flat material web 14 jointly covers the upper edges (which are at the bottom in FIG. 4) of the cup-shaped recesses 10, and it is preferably a non-vibratory web, i.e., a web which cannot be excited into natural vibrations by sound vibrations in the assembled condition of the element.

Crimp-shaped recesses 15 are provided in the bottom surfaces 12 of the cup-shaped recesses 10 in principle in the same manner as in the embodiment according to FIGS. 1 to 3, but with certain differences which are explained in the following.

Figure 5:
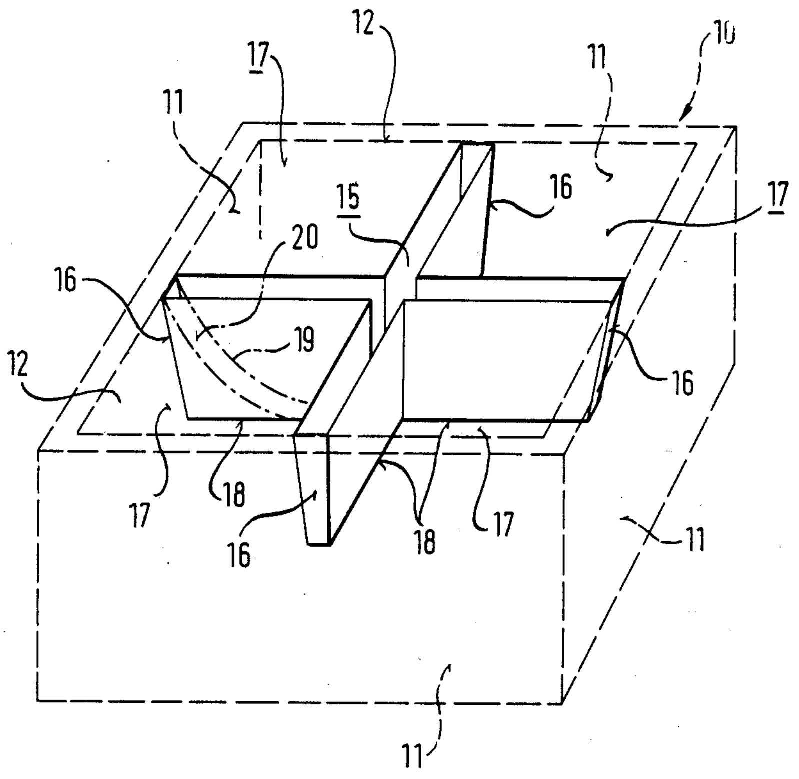
FIG. 5 shows a perspective view of a single bottom surface having a crimp-shaped recess, from the sound-absorbing element according to FIG. 4.

As shown by FIG. 5 which is an enlarged illustration of a single bottom surface 12 of a cup-shaped recess 10, the two crimp-shaped recesses 15 which form a cross have their own front faces 16 which seal off the crimp-shaped recesses 15 at their longitudinal ends, i.e., at their ends which are located in the region of the common lateral or surrounding surfaces 11. These front faces 16 are positioned at a distance from the common lateral or surrounding surfaces. However, the crimp-shaped recesses extend up to the common lateral or surrounding surfaces 11 on the level of the bottom surfaces 6 which are subdivided into bases 17 by the crimp-shaped recesses 15. On the other hand, the front faces 16 of the crimp-shaped recesses 15 having a spacing, although relatively small, from the lateral or surrounding surfaces 11 which increases towards the base surfaces 18 of the crimp-shaped recesses (see FIG. 5).

Finally, reference will now be made to FIGS. 6, 7 and 8 which show the results of tests.

Figure 7:
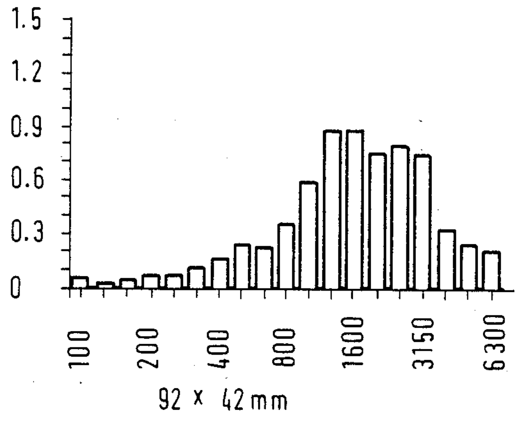
FIG. 7 shows a sound absorption spectrum corresponding to FIG. 6, but the bottom surfaces of the cup-shaped recesses are $9.2\times4.2$ cm in size.
Figure 6:
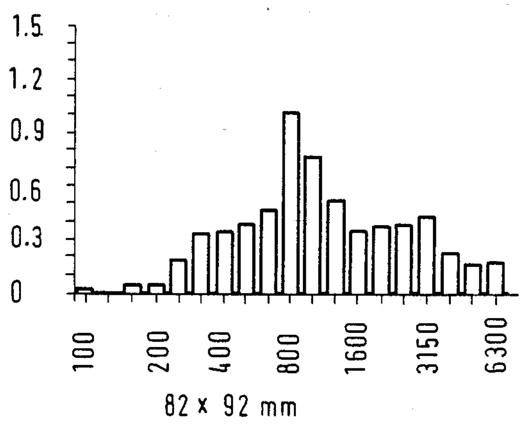
FIG. 6 shows a sound absorption section which reproduces the acoustic absorptivity of a sound-absorbing element according to DE-OS 2,758,041, the bottom surfaces of the cup-shaped recesses having a size of $8.2\times9.2$ cm.

FIGS. 6 and 7 illustrate the frequency absorption spectrum of sound-absorbing elements, in which the cup-shaped recesses provided in grid-form did not have any crimp-shaped recesses. In FIG. 6, the dimension of the bottom surfaces was 8.2×9.2 cm and in FIG. 7, the dimension of the bottom surfaces was 9.2×4.2 cm. A comparison of these two FIGS. shows that as a result of making the bottom surfaces smaller, the acoustic absorptivity plotted on the ordinate increased at the higher frequencies plotted on the abscissa, but it decreased at the lower frequencies (the frequencies are plotted in Hertz on the abscissa).

Figure 8:
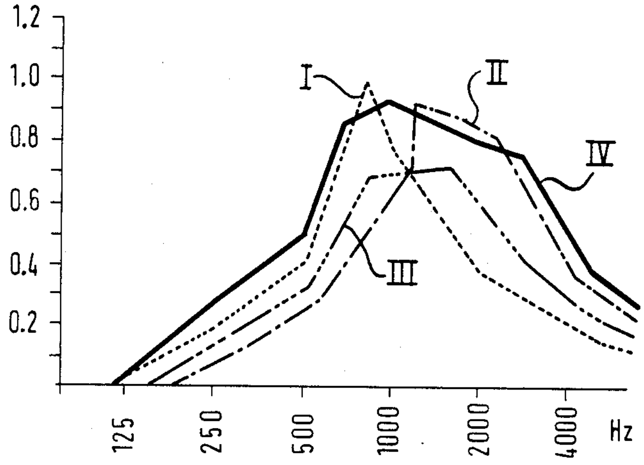
FIG. 8 shows several sound absorption curves to illustrate the effect which is achieved with a sound-absorbing element according to the present invention, compared to other sound-absorbing elements in which the bottom surfaces of the cup-shaped recesses did not have any crimp-shaped recesses.

FIG. 8 combines the results of the tests shown in FIGS. 6 and 7 as well as other test results. Four sound absorption curves are shown which illustrate the dependence of the acoustic absorptivity plotted along the ordinate on the frequency plotted along the abscissa, namely:

(a) Curve I is the sound absorption curve which is achieved if the cup-shaped recesses have relatively large bottom surfaces. It is seen that a maximum absorptivity is produced at about 800 Hz, whereas the absorptivity decreases very rapidly from this frequency to both sides.

(b) Curve II is the sound absorption curve which is produced if the cup-shaped recesses have relatively small bottom surfaces. It is seen that the absorption maximum is at more than 1,000 Hz, and mainly higher frequencies are absorbed.

(c) Curve III is the absorption curve which is produced when 50 % of the cup-shaped recesses have relatively small bottom surfaces and 50 % have relatively large bottom surfaces. It is seen that although an evening-out of the absorptivity is produced over the complete frequency range compared to curves I and II, the values of the absorptivity at the different frequencies are smaller in absolute terms than in the case of curves I and II, so that approximately double the quantity of absorbers has to be provided in the respective space.

(d) Curve IV is the absorption curve which is produced if cup-shaped recesses are provided with relatively large bottom surfaces, and these bottom surfaces are subdivided according to the present invention into four bases by crimp-shaped recesses. It is seen that an evening-out of the sound absorption is achieved over the complete frequency range compared to curves I and II, and an increase in the absolute absorptivity at the different frequencies is also achieved compared to curve III.

Figure 9:
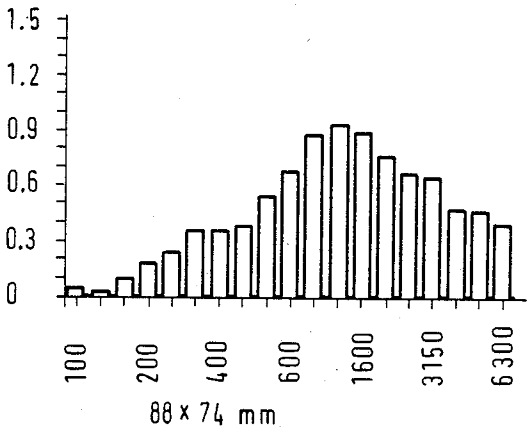
FIG. 9 shows an absorption spectrum which was measured on an element according to the present invention.

Finally, FIG. 9 shows a measured sound absorption spectrum in a manner corresponding to FIG. 6 and 7, but based on curve IV in FIG. 8, the cup-shaped recesses having a bottom surface of 8.8×7.4 cm and this bottom surface being subdivided into four equal-size bases by crimp-shaped recesses, the depth of which was smaller than the depth of the cup-shaped recesses.

Reference will now be made again to FIG. 5, in which the two dot-dashed parallel lines 19 indicate that the front face 16 and the half, adjacent thereto, of the respective base surface 18 may also be designed so that they both form a common, smooth front-and-bottom surface 20, i.e., the front face 16 and the half, adjacent thereto, of the base surface 18 do not merge into one another via a bend or other discontinuity. In FIG. 5, for reasons of clarity, this modification is indicated by a dot-dashed line 19 only for a single front face 16 and for the half, adjacent thereto, of the respective base surface 18, but in fact this modification is provided in the case of all the front faces 16 and base surfaces 18, so that, for example all four front-and-bottom surfaces 20 which then result may lie on a common hemispherical surface. However, it is not necessary for the individual front-and-bottom surfaces 20 to merge constantly into one another. Instead, the lines 19 may be, for example straight, so that each front-and-bottom surface 20 then lies on a different plane.

Furthermore, two or more sound-absorbing elements 1 and/or 9 may be joined together, in particular bonded together, at their backs, i.e., the sides opposite the bottom surfaces 3 and 12 respectively, so that they absorb sound from all sides when they are in a vertically hanging position. In this case, the other material web 5 and 14 respectively which is provided on the back may optionally be omitted, because the cup-shaped recesses 2 and 10 respectively of the elements 1 and 9 respectively are mutually covered by the back-to-back arrangement, i.e., the cup-shaped recesses of one sound-absorbing element simultaneously take over the function of the other covering material web of the other sound-absorbing element which is joined thereto.

We claim:

1. A sound-absorbing element comprising a plurality of cup-shaped recesses being covered by a flat web, each of said cup-shaped recesses having a bottom surface consisting of a film, said bottom surfaces being directly exposed to a sound field during installation and the size of said bottom surfaces being such that they are excitable to a plurality of natural vibrations upon the incidence of sound at a plurality of frequencies, each of said bottom surfaces being subdivided by at least one crimp-shaped recess into bottom subsurfaces, the depth of said crimp-shaped recess is appreciably smaller than the depth of said cup-shaped recesses, and said crimp-shaped recess extends from one side of one said bottom surface to the other side thereof and separates said subsurfaces completely from one another.

2. A sound-absorbing element according to claim 1, wherein the cup-shaped recesses are laterally defined by lateral surfaces, and adjacent cup-shaped recesses share common lateral surrounding surfaces.

3. A sound-absorbing element according to claim 2, wherein the crimp-shaped recesses intersect the said lateral surrounding surfaces of the cup-shaped recesses.

4. A sound-absorbing element according to claim 2, wherein the crimp-shaped recesses have their own front faces which seal off the crimp-shaped recesses at their longitudinal ends.

5. A sound-absorbing element according to claim 4, wherein the said front faces of the crimp-shaped recesses are spaced from the adjacent common lateral surrounding surface of the cup-shaped recesses.

6. A sound-absorbing element according to claim 5, wherein the front faces of the crimp-shaped recesses meet, at the level of the said bottom surfaces with the common lateral surrounding surfaces of the cup-shaped recesses, diverge from the said lateral faces in a direction away from the said bottom surfaces.

7. A sound-absorbing element according to claim 6, wherein each crimp-shaped recess has a base surface which merges into the front face thereof to form a single smoothly running surface.

8. A sound-absorbing element according to claim 1, wherein the crimp-shaped recesses run parallel to one or more lateral boundary lines of the bottom surfaces of the cup-shaped recesses, the bottom surfaces being restricted in a straight line.

9. A sound-absorbing element according to claim 1, wherein the bottom surface of each cup-shaped recess is provided with at least two crossing crimp-shaped recesses.

10. A sound-absorbing element according to claim 9, wherein the two crimp-shaped recesses run at a right angles to one another.

11. A sound-absorbing element according to claim 1, wherein a plurality of crimp-shaped recesses of a varying depth are provided such that crimp-shaped recesses of greater depth have bases which are subdivided by crimp-shaped recesses of lesser depth.

12. A sound-absorbing element comprising first and second films, each of said films being formed into a plurality of cup-shaped recesses having a bottom surface consisting of a film, said bottom surfaces being directly exposed to a sound field during installation and the size of said bottom surfaces being such that they are excitable to a plurality of natural vibrations upon the incidence of sound at a plurality of frequencies, each of said bottom surfaces being subdivided by at least one crimp-shaped recess into bottom subsurfaces, the depth of said crimp-shaped recess is appreciably smaller than the depth of the cup-shaped recesses, said crimp-shaped recess extends from one side of one said bottom surface to the other side thereof and separates said subsurfaces completely from one another, said first and second films being joined together face-to-face so that the said bottom surfaces are outwardly directed.

13. A sound-absorbing element comprising a plurality of cup-shaped recesses, each of said cup-shaped recesses having a generally planar bottom surface formed of a film and a plurality of generally planar lateral surrounding surfaces, said bottom surfaces being directly exposed to a sound field during installation and the size of said bottom surfaces being such that they are excitable to a plurality of natural vibrations upon the incidence of sound at a plurality of frequencies, each of said bottom surfaces being subdivided by at least one crimp-shaped recess into bottom subsurfaces, the depth of said crimp-shaped recess is appreciably smaller than the depth of said cup-shaped recesses, said crimp-shaped recess extends from one side of one said bottom surface to the other side thereof and separates said subsurfaces completely from one another; and a flat web covering the opening of said cup-shaped recesses.

14. A sound-absorbing element according to claim 13, wherein said crimp-shaped recess divides the bottom surface into at least two said bottom subsurfaces, said crimp-shaped recess extending from one of said lateral surrounding surfaces to a lateral surrounding surface located on the opposite side of said cup-shaped recess.

15. A sound-absorbing element according to claim 14, which comprises at least two crimp-shaped recesses which intersect each other to divide said bottom surfaces into at least four said bottom subsurfaces.

* * * * *